United States Patent
Ellard (10) Patent No.: US 9,037,800 B2
(45) Date of Patent: May 19, 2015

(54) SPECULATIVE COPYING OF DATA FROM MAIN BUFFER CACHE TO SOLID-STATE SECONDARY CACHE OF A STORAGE SERVER

(71) Applicant: NetApp, Inc., Sunnyvale, CA (US)

(72) Inventor: Daniel J. Ellard, Belmont, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/918,804

(22) Filed: Jun. 14, 2013

(65) Prior Publication Data

US 2014/0181374 A1 Jun. 26, 2014

Related U.S. Application Data (63) Continuation of application No. 12/050,921, filed on Mar. 18, 2008, now Pat. No. 8,489,820.

(51) Int. Cl.
| | |
|---|---|
| G06F 12/00 | (2006.01) |
| G06F 12/02 | (2006.01) |
| G06F 12/08 | (2006.01) |

(52) U.S. Cl.
CPC ........ G06F 12/0246 (2013.01); G06F 12/0808 (2013.01); G06F 12/0804 (2013.01); G06F 12/0868 (2013.01); G06F 2212/214 (2013.01)

(58) Field of Classification Search
CPC ............ G06F 12/0246; G06F 12/0808; G06F 12/0804; G06F 12/0868; G06F 2212/214
USPC ................................. 711/118, 120, 122, 142
See application file for complete search history.

(56) References Cited

U.S. PATENT DOCUMENTS

| | | | |
|---|---|---|---|
| 5,815,458 A | 9/1998 | Chevallier et al. | |
| 6,119,205 A | 9/2000 | Wicki et al. | |
| 6,725,337 B1 | 4/2004 | Tan et al. | |
| 6,851,024 B1 | 2/2005 | Wilkes et al. | |
| 7,272,687 B2 * | 9/2007 | Balasubramanian | 711/114 |
| 8,489,820 B1 | 7/2013 | Ellard | |
| 2003/0212865 A1 | 11/2003 | Hicken et al. | |
| 2006/0143406 A1 | 6/2006 | Chrysos et al. | |
| 2006/0143407 A1 * | 6/2006 | Humlicek | 711/143 |
| 2008/0276040 A1 | 11/2008 | Moritoki | |
| 2009/0089508 A1 | 4/2009 | Trika et al. | |

OTHER PUBLICATIONS

Stenstrom, A Survey of Cache Coherence Schemes for Multiprocessors, 1990.*

(Continued)

*Primary Examiner* — Gurtej Bansal
(74) *Attorney, Agent, or Firm* — Perkins Coie LLP (57) ABSTRACT

A network storage server includes a main buffer cache to buffer writes requested by clients before committing them to primary persistent storage. The server further uses a secondary cache, implemented as low-cost, solid-state memory, such as flash memory, to store data evicted from the main buffer cache or data read from the primary persistent storage. To prevent bursts of writes to the secondary cache, data is copied from the main buffer cache to the secondary cache speculatively, before there is a need to evict data from the main buffer cache. Data can be copied to the secondary cache as soon as the data is marked as clean in the main buffer cache. Data can be written to secondary cache at a substantially constant rate, which can be at or close to the maximum write rate of the secondary cache.

23 Claims, 6 Drawing Sheets

(56) References Cited

OTHER PUBLICATIONS

Adam Leventhal, "Flash Storage Memory," Communications of the ACM; vol. 51; No. 7; Jul. 2008; pp. 47-51.

EMC Data Sheet, "EMC Symmetrix DMX Series, The World's Most Trusted Storage Platform," 8 pages, Jan. 2008.

EMC Press Release, "EMC²® Where Information Lives®, EMC in Major Storage Performance Breakthrough; First with Enterprise-Ready Solid State Flash Drive Technology," http://www.prnewswire.com/mnr/emc/31368, 3 pages, Webcast: David Donatelli Discusses EMC's Latest Storage Innovation (Jan. 14, 2008).

Final Office Action Mailed Feb. 7, 2011 of Co-Pending U.S. Appl. No. 12/050,921 of Ellard, D.J. filed Mar. 18, 2008.

Final Office Action Mailed Sep. 18, 2012 of Co-Pending U.S. Appl. No. 12/050,921 of Ellard, D.J. filed Mar. 18, 2008.

Gal, E. and Toledo. S. 2005. Algorithms and data structures for flash memories. ACM Comput. Surv. 37, 2 (Jun. 2005), 138-163.

Non-Final Office Action Mailed Apr. 23, 2012 of Co-Pending U.S. Appl. No. 12/050,921 of Ellard, D.J. filed Mar. 18, 2008.

Non-Final Office Action Mailed Sep. 15, 2010 of Co-Pending U.S. Appl. No. 12/050,921 of Ellard, D.J. filed Mar. 18, 2008.

Notice of Allowance Mailed Mar. 3, 2013 of Co-Pending U.S. Appl. No. 12/050,921 of Ellard, D.J. filed Mar. 18, 2008.

Per Stenstrom, A Survey of Cache Coherence Schemes for Multiprocessors, 1990.

* cited by examiner

SPECULATIVE COPYING OF DATA FROM MAIN BUFFER CACHE TO SOLID-STATE SECONDARY CACHE OF A STORAGE SERVER

CROSS-REFERENCE TO RELATED APPLICATION

This application is a continuation application of U.S. patent application Ser. No. 12/050,921, filed on Mar. 18, 2008, and entitled "SPECULATIVE COPYING OF DATA FROM MAIN BUFFER CACHE TO SOLID-STATE SECONDARY CACHE OF A STORAGE SERVER," which is incorporated herein in its entirety by reference.

TECHNICAL FIELD

At least one embodiment of the present invention pertains to network storage systems, and more particularly, to a network storage server that includes solid-state memory to improve storage server performance.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive drives (RAID)).

A storage server may be configured to service file-level requests from clients, as in the case of file servers used in a network attached storage (NAS) environment. Alternatively, a storage server may be configured to service block-level requests from clients, as done by storage servers used in a storage area network (SAN) environment. Further, some storage servers are capable of servicing both file-level and block-level requests, as done by certain storage servers made by NetApp, Inc. of Sunnyvale, Calif.

It is desirable to improve the performance of storage servers, and one way to do so is by reducing the latency associated with accessing stored data. To accomplish this, a storage server may include internal random access memory (RAM) that is used as a buffer cache, to speed up the reading and writing of data from and to (respectively) the main mass storage system. In conventional storage servers, this buffer cache typically is implemented the form of dynamic RAM (DRAM). However, RAM is generally very expensive, so it is prohibitively expensive to equip a storage server with enough RAM to service all of the incoming requests, especially in a large-scale enterprise storage system.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for using low-cost solid-state memory to improve network storage server performance are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A network storage server may include a main buffer cache implemented in RAM to buffer new or modified data before committing them to primary persistent storage and to buffer data read from primary persistent storage. In accordance with the techniques introduced here, such a storage server also includes or uses a secondary cache, which in certain embodiments is implemented as low-cost, solid-state memory, such as flash, to store data evicted from the main buffer cache and/or data read from the primary persistent storage.

Flash memory generally has a much slower write access speed than that of RAM, which can cause significant latency in certain workloads, such as when the main buffer cache (RAM) becomes full and the rate at which data must be evicted from the main buffer cache exceeds the maximum write speed of the flash memory. Therefore, to prevent significant latency during writes to the secondary cache, data is copied from the main buffer cache to the secondary cache speculatively, before there is a need to evict data from the main buffer cache. Data can be copied from the main buffer cache to the secondary cache as soon as the data has been committed to primary persistent storage. This feature is particularly valuable, because there are workload patterns that result in the eviction of a large number of blocks from main buffer cache very quickly—more quickly than they could be copied to low-cost solid-state drives (SSDs), which do not have good write performance, and more quickly than the secondary cache map can be updated. Thus, the secondary cache will not degrade system performance, even when data is pushed out of the main buffer cache more quickly than the secondary cache can absorb it. The writing of data to the secondary cache can be carried out as a background operation so as to write data to the secondary cache at a substantially constant rate, for example, at or close to the maximum write rate of the solid-state memory. These features and techniques are described further below.

As indicated above, it is desirable to reduce the latency associated with accessing a storage server's storage. However, RAM is too expensive to make it practical to equip a storage server with enough RAM to store all the data required to satisfy all of the incoming requests in a large-scale enterprise storage system.

Flash memory has certain properties which make it very desirable for use in buffering data in a network storage system. For example, flash is considerably cheaper and denser than DRAM. Also, flash generally has very good (fast) random read performance and is not volatile like DRAM. On the other hand, streaming write performance of flash is considerably poorer (slower) than that of conventional disks, particularly for lower-end (low-cost) flash memory.

The techniques introduced here include augmenting the main buffer (RAM) cache of a network storage server by adding a secondary cache, implemented in low-cost, solid-state memory, such as flash memory. In certain embodiments, the flash memory is in the form of flash solid-state drives (SSDs). The secondary cache is used to cache data blocks that are being, or that may in the future be, evicted from the main buffer cache (such blocks are called "victims"). In at least some instances, data blocks are copied from the main buffer cache to the secondary (solid-state) cache as soon as they have been committed to persistent storage, before there is a need to evict data from the main buffer cache. Thus, assuming the secondary cache is implemented in flash or some other type of memory with similar write access speed limitations, this technique of speculatively copying data to the secondary cache reduces the likelihood that significant latency will occur due to the workload requiring eviction of blocks from main buffer cache faster than they can be written to the secondary cache.

Note that while flash is discussed herein as one type of solid-state memory that can be used, the techniques introduced here do not necessarily require that the secondary cache be implemented as flash. Another type of solid-state memory could be used instead for that purpose, provided it has advantageous characteristics in terms of cost, access speed, etc.

Figure 1:
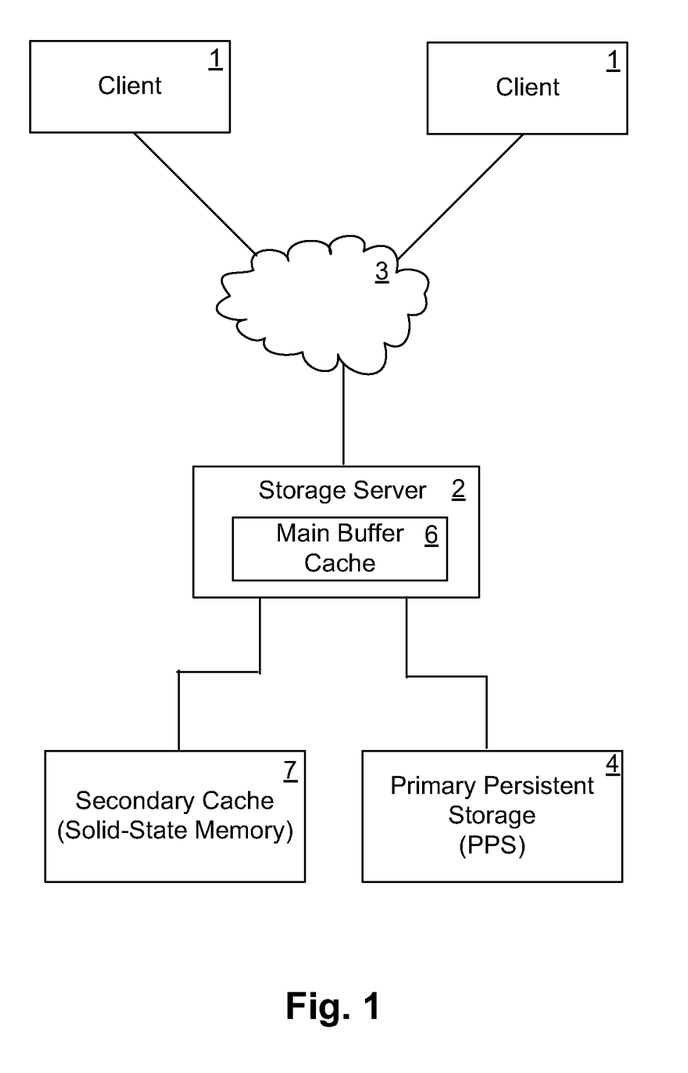
FIG. 1 illustrates a network storage system in which the present invention can be implemented.

Refer now to FIG. 1, which shows a network storage system in which the present invention can be implemented. In FIG. 1, a storage server 2 is coupled to a primary persistent storage (PPS) subsystem 4 that includes multiple non-volatile mass storage devices (not shown), and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The mass storage devices in the PPS subsystem 4 can be, for example, conventional magnetic or optical disks or tape drives; alternatively, they can be non-volatile solid-state memory, such as flash memory. The mass storage devices in storage subsystem 4 can be organized as a Redundant Array of Inexpensive Disks/Devices (RAID), in which case the storage server 2 accesses the storage subsystem 4 using one or more well-known RAID protocols. The storage server 2 also includes a main buffer cache 6, which can be implemented as DRAM, for example.

Further, in accordance with the techniques introduced here, the storage server 2 is also coupled to a secondary cache 7, which in certain embodiments is solid-state memory, such as flash memory. In certain embodiments, the secondary cache 7 is implemented as a set of flash SSDs.

The storage server 2 may be a file-level server such as used in a NAS environment, a block-level storage server such as used in a SAN environment, or a storage server which is capable of providing both file-level and block-level service. Further, although the storage server 2 is illustrated as a single unit in FIG. 1, it can have a distributed architecture. For example, the storage server 2 can include a physically separate network module (e.g., "N-blade") and disk module (e.g., "D-blade") (not shown), which communicate with each other over an external interconnect.

Figure 2:
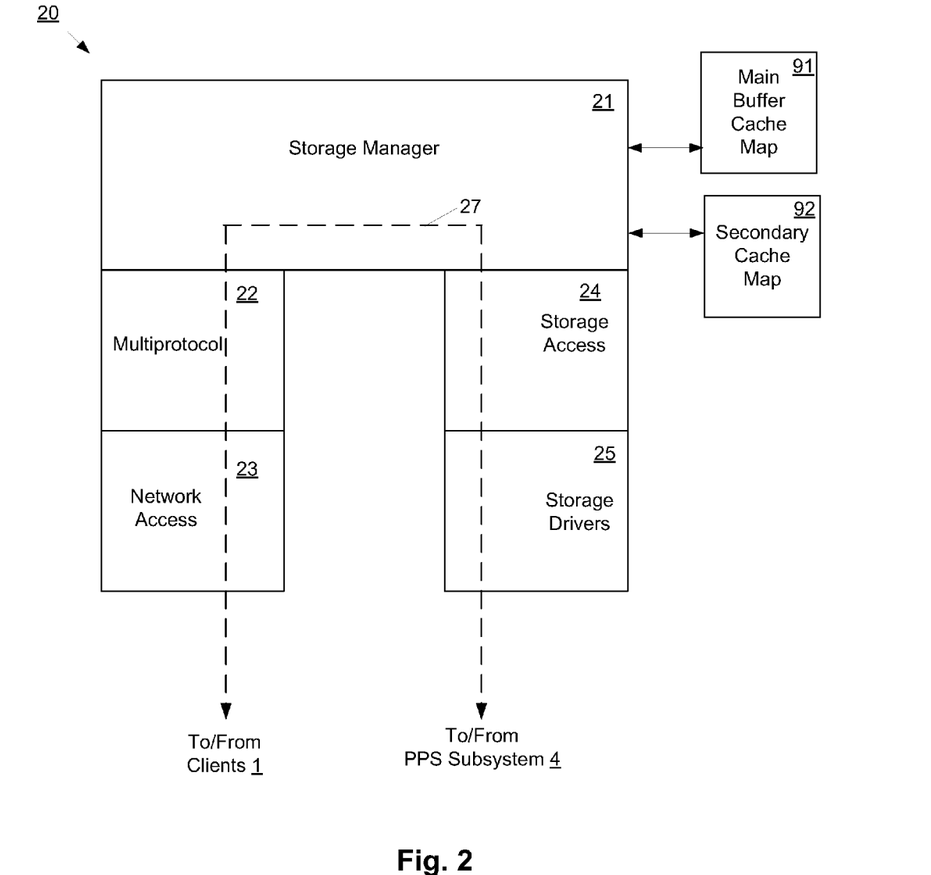
FIG. 2 illustrates an example of a storage operating system implemented within a storage server.

FIG. 2 schematically illustrates an example of a storage operating system that can be implemented in the storage server 2. In the illustrated embodiment, the storage operating system 20 includes several software modules, or "layers". These layers include a storage manager 21, which is the core functional element of the storage operating system 20. The storage manager 21 is application-layer software which imposes a structure (e.g., a hierarchy) on the data stored in the PPS subsystem 4 and which services read and write requests from clients 1. To improve performance, the storage manager 21 accumulates batches of writes in the main buffer cache 6 and then streams them to the PPS subsystem 4 as large, sequential writes. In certain embodiments, the storage manager 21 manages a log-structured file system and implements a "write out-of-place" (also called "write anywhere") policy when writing data to the PPS subsystem 4. In other words, whenever a logical data block is modified, that logical data block, as modified, is written to a new physical storage location (physical block), rather than overwriting the data block in place.

The storage manager 21 maintains several metadata structures, including a main buffer cache map 91 and a secondary cache map 92. Each cache map 91 or 92 implicitly includes information about whether a valid (up-to-date) copy of each data block (indexed by either logical or physical address) is present in the corresponding cache. For each block that has a copy in the cache, additional information about the copy is represented in the cache map, including the location of the copy within the cache and whether the data in that copy is clean or dirty. A block is considered "clean" when the newest value of the block has been successfully written to the PPS subsystem 4 and "dirty" when the value of the block in the cache is newer than the copy of the block in the PPS subsystem 4. The event during which dirty data blocks stored in the main buffer cache 6 are written to the PPS subsystem 4 is called a consistency point ("CP").

Logically "under" the storage manager 21, to allow the storage server 2 to communicate over the network 3 (e.g., with clients 1), the storage operating system 20 also includes a multiprotocol layer 22 and a network access layer 23. The multiprotocol 22 layer implements various higher-level network protocols, such as Network File System (NFS), Common Internet File System (CIFS), Hypertext Transfer Protocol (HTTP) and/or Internet small computer system interface (iSCSI). The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also logically under the storage manager 21, to allow the storage server 2 to communicate with the persistent storage subsystem 4, the storage operating system 20 includes a storage access layer 24 and an associated storage driver layer 25. The storage access layer 24 implements a higher-level disk storage protocol, such as RAID-4, RAID-5 or RAID-DP, while the storage driver layer 25 implements a lower-level storage device access protocol, such as Fibre Channel Protocol (FCP) or small computer system interface (SCSI).

Also shown in FIG. 2 is the path 27 of data flow through the operating system 20, associated with a read or write operation, from the client interface to the PPS interface. Thus, the storage manager 21 accesses the PPS subsystem 4 through the storage access layer 24 and the storage driver layer 25. In some embodiments, the storage manager 21 can access the main buffer cache 6 and the secondary cache 7 directly, i.e., without going through the storage access layer 24 and storage driver layer 25. In other embodiments, however, the storage manager 21 accesses the main buffer cache 6 and/or the secondary cache 7 through the storage access layer 24 and storage driver layer 25, or through one or more separate software layers that perform similar functionality.

In accordance with the techniques introduced here, data blocks being evicted from the main buffer cache 6 are copied to the secondary cache 7, which is implemented in flash or another type of solid-state memory. A data block can be evicted from the main buffer cache 6 as soon as it has been marked as "clean", since clean data blocks are those which have been written to the PPS subsystem 4. In accordance with the technique introduced here, in at least some instances, data blocks are speculatively copied from the main buffer cache 6 to the secondary cache 7 as soon as they have been marked as clean in the main buffer cache map 91, before any blocks need to be evicted from the main buffer cache 6. Thus, if the secondary cache 7 is implemented in flash or some other type of memory with similar write access speed limitations, this technique reduces the likelihood that significant latency will occur due to the workload requiring eviction of blocks from main buffer cache 6 faster than blocks can be written to the secondary cache 7.

Furthermore, in the event that blocks need to be evicted from the main buffer cache 6 before they can be copied to the secondary cache 7 (e.g., during workloads with frequent writes of many data blocks), clean data blocks in the main buffer cache 6 can simply be discarded (i.e., without copying them to the secondary cache 7), since they have already been committed to the PPS subsystem 7. Thus, the secondary cache 7 does not degrade system performance. The storage manager 21 may also, as a background activity, prefetch data blocks from the PPS subsystem 4, and place them into the secondary cache 7 in anticipation of future client activity.

Whenever a block is written into the main buffer cache 6 in response to a client write request, the storage manager 21 will determine whether an older copy of the block already exists in the secondary cache 7, and if so, the storage manager 21 will invalidate that cached copy in the secondary cache map 91. To improve performance, when a write requires more space than is available in the main buffer cache 6, the storage manager 21 may execute a heuristic to determine the victim blocks to evict from the main buffer cache 6 in order to make room.

Most caching systems use heuristics to choose the blocks that are least likely to benefit from caching. In many cases, at any instant in time, the heuristics define a total order (e.g., least recently used (LRU)) or partial order (e.g., least frequently used (LFU), clock with adaptive replacement (CAR)) for all of the blocks in the main buffer cache. When viewed in this manner, these heuristics provide a mechanism to provide an estimate of which blocks are likely to be evicted in the near future.

In accordance with the techniques introduced here, since it is known which blocks are likely to be evicted in the near future (e.g., by employing a heuristic such as just mentioned), the work of evicting them can begin speculatively, i.e., before it is necessary, taking into consideration the characteristics of the type of memory used to implement the secondary cache 7. This approach permits the stream of evictions to appear to take place at a substantially constant rate (e.g., at or near the streaming rate of the memory devices that implement the secondary cache 7), rather than in bursts that momentarily exceed the sustainable rate of the memory devices (and therefore cause the system to choose between throttling down to the memory devices' write speed or evicting the blocks from the main buffer cache 6 without copying them to the secondary cache 7, thereby losing the benefit of the secondary cache 7). Hence, the speculative copying of data blocks to the secondary cache 7 reduces the expected peak rate at which victim blocks are copied to the secondary cache 7, i.e., reduces the likelihood of bursts of writes to the secondary cache 7.

When a block is required to satisfy a read request, the system first determines whether the block is in the main buffer cache 6. If the block is present in the main buffer cache 6, then the block is accessed from there. If not, then the system checks the secondary buffer cache 7, and if the block is present there, it is fetched from the secondary cache 7, brought into the main buffer cache 6 (possibly causing the eviction of some other block), and accessed from there. Otherwise, it is fetched from the PPS subsystem 4 as normal.

Because the secondary cache 7 is not needed for correctness of operation (i.e., it caches only "clean" data), low-cost parts with rapid wear-out or failure can be used to implement the secondary cache 7. If any device in the secondary cache 7 fails, the system can automatically invalidate the secondary cache map 92 and continue operation with a smaller secondary cache 7. If an SSD needs to be swapped out due to failure or anticipated wear-out, the system can continue with degraded performance. Similarly, to upgrade the capacity of the secondary cache 7, new SSDs can be added to the system at any time.

One advantage of the above-described approach is that it permits low-cost SSDs, which have good random read performance but relatively poor write performance, to play a role in increasing the overall performance of a storage system in which writes are aggregated and dispatched to disk (e.g., PPS subsystem) as large, sequential operations. If the secondary cache 7 is large enough, most reads can be satisfied from the secondary cache 7 instead of from the PPS subsystem 4. Since random accesses to SSDs are currently much faster than random disk accesses, this is a desirable situation. Hence, by dividing the workload between devices optimized for each aspect of the storage lifecycle, one can achieve good system performance for each aspect without requiring high-cost, high-performance devices.

Figure 3A:
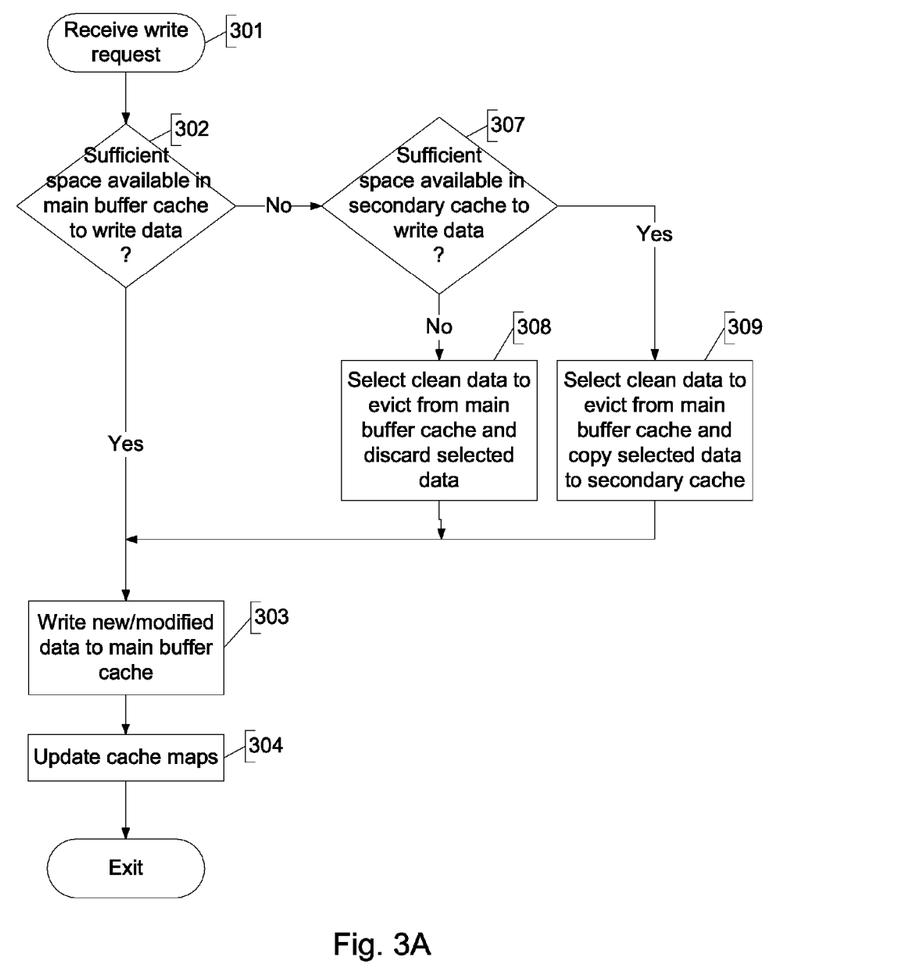
FIG. 3A is a flow diagram showing a process in a storage server for processing write requests.

FIG. 3A illustrates one example of a process which the storage server 2 may employ to process write requests from clients 1. Note that many variations upon this process are possible while still adhering to the basic principles introduced herein. Note that FIG. 3A and the other figures are intended to be conceptual in nature, such that certain implementation details which are not germane to the concepts being taught here have been omitted, for clarity.

Initially, at 301 the storage server 2 receives a write request from a client 1. Next, at 302 the storage manager 21 determines whether sufficient space is available in the main buffer cache 6 to write the new or modified data specified by the write request. If sufficient space is available, the process continues to 303; otherwise, the process branches to 307.

At 303, the storage manager 21 writes the new or modified data to the main buffer cache 6. The storage manager 21 then updates main buffer cache map 91 and/or secondary cache map 92 as appropriate at 304.

Note that, in a separate process (not shown), the storage manager 21 determines when it is time for the next consistency point. A consistency point may occur periodically and/or in response to specific trigger events (e.g., when the amount of used space in the main buffer cache 6 exceeds a certain threshold). When the time for the next consistency point arrives, all "dirty" data in the main buffer cache 6 is written to the PPS subsystem 4 and then marked as clean in the appropriate cache maps.

Referring back to 302, if there is insufficient space available in the main buffer cache 6 to write the new or modified data, then the process branches to 307, where the storage manager 21 determines whether there is enough space available in the secondary cache 7 to store the data. If there is not enough space, then at 308 the storage manager 21 selects clean data to evict from the main buffer cache 6 and then discards that data. Any of various well-known heuristics can be employed to decide which data to evict from the main buffer cache 6, such as LRU, LFU, etc. The process then continues to 303, as described above. If, however, the secondary cache 7 has sufficient space at 307, then at 309 the storage manager 21 selects clean data to evict from the main buffer cache 6 and copies the selected data to the secondary cache 7. The process then continues to 303, as described above.

After the secondary cache 7 becomes full, data are discarded from the secondary cache 7 via a separate mechanism to make space for new data in the secondary cache 7. There are many established and well-known heuristics that can be used to select which data to discard from the secondary cache 7, such as LRU, LFU, first-in-first-out (FIFO), among many others. The goal of such heuristics in this application is to balance the utility of discarding a data item from the cache to make space for a new item and the utility of retaining that data item in the cache in case it is accessed again soon. The mechanism for discarding data from the secondary cache 7 can be an asynchronous process that runs independently of the reads and writes occurring in the storage server 2, or it may be triggered by the outcome of decision 307 in FIG. 3A.

Figure 3B:
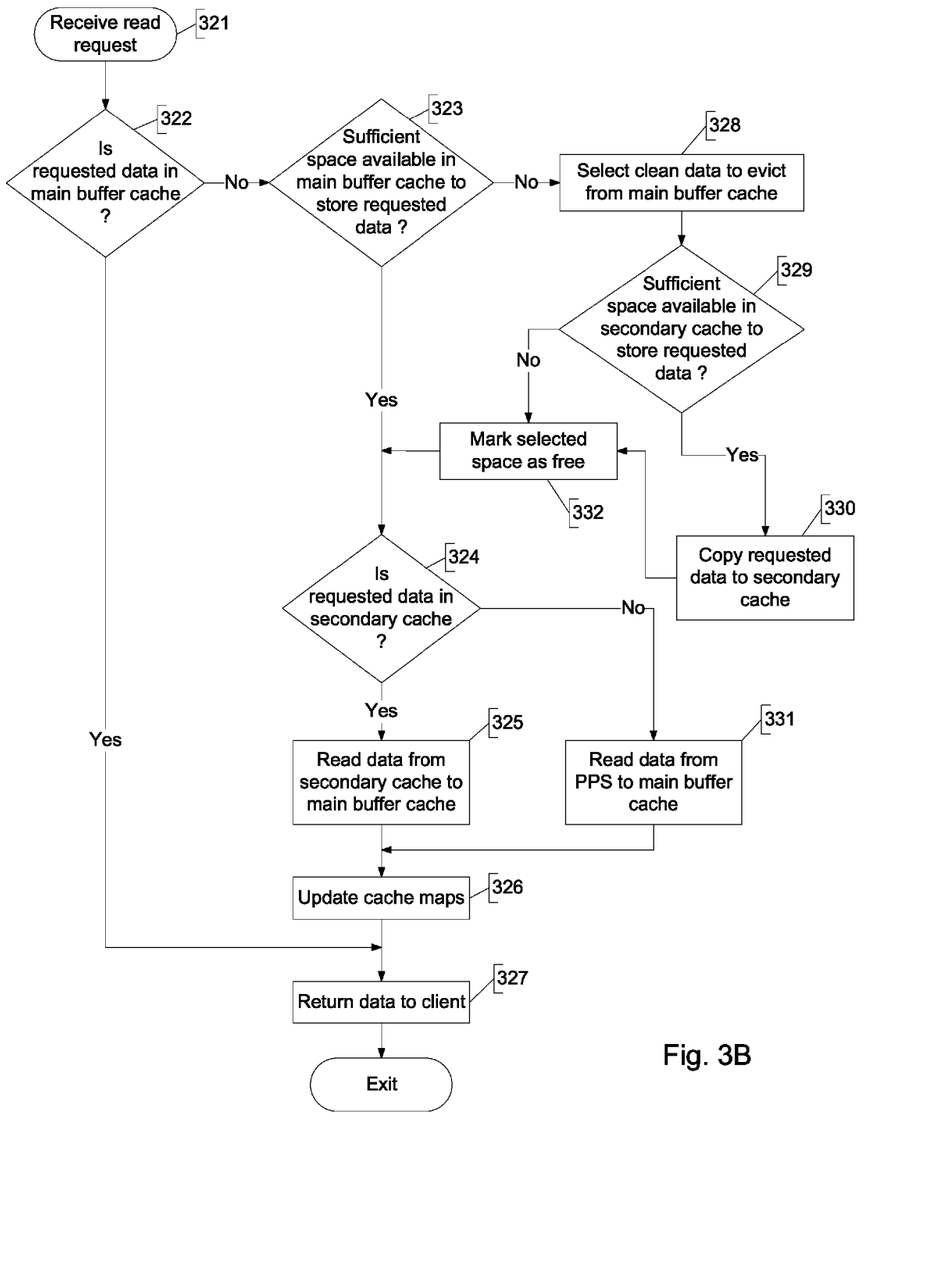
FIG. 3B is a flow diagram showing a process in a storage server for processing read requests.

FIG. 3B illustrates one example of a process which the storage server 2 may employ to process read requests from clients 1. As with the above write process, many variations upon this process are possible while still adhering to the basic principles introduced herein. Initially, when a read request is received by the storage server 2 from a client 1 at 321, the storage manager 21 determines whether the requested data is in the main buffer cache 6. If the requested data is in the main buffer cache 6, the storage manager 21 accesses that data and returns it to the client 1 at 327.

If the requested data is not in the main buffer cache 6, the process branches to 323, where the storage manager 21 determines whether sufficient space is available in the main buffer cache 6 to store the requested data. If sufficient space is available, the process proceeds to 324, where the storage manager 21 determines whether the requested data is in the secondary cache 7. If the requested data is in the secondary cache 7, the storage manager 21 then reads the data from the secondary cache 7 into the main buffer cache 6 at 325. If, on the other hand, the requested data is not in the secondary cache 7, the storage manager 21 reads the requested data from the PPS 4 into the main buffer cache 6 at 331. After 325 or 331, the storage manager 21 updates the cache maps 91 and/or 92 as appropriate at 326, and then returns the data to the requesting client 1 at 327.

Referring back to 323, if sufficient space is not available to store the requested data in the main buffer cache 6, the process branches to 328, where the storage manager 21 selects clean data to evict from the main buffer cache 6 (to make room for the requested data). The storage manager 21 then determines at 329 whether sufficient space is available in the secondary cache 7 to store the requested data. If sufficient space is not available in the secondary cache 7, the process proceeds to 332, where the space occupied by the data being evicted from the main buffer cache 6 is marked as free. If sufficient space is available in the secondary cache 7, the storage manager 321 copies the requested data from the PPS 4 into the secondary cache 7 at 330, and then proceeds to 332 as described above. After 332, the process proceeds to 324 as described above.

Figure 4:
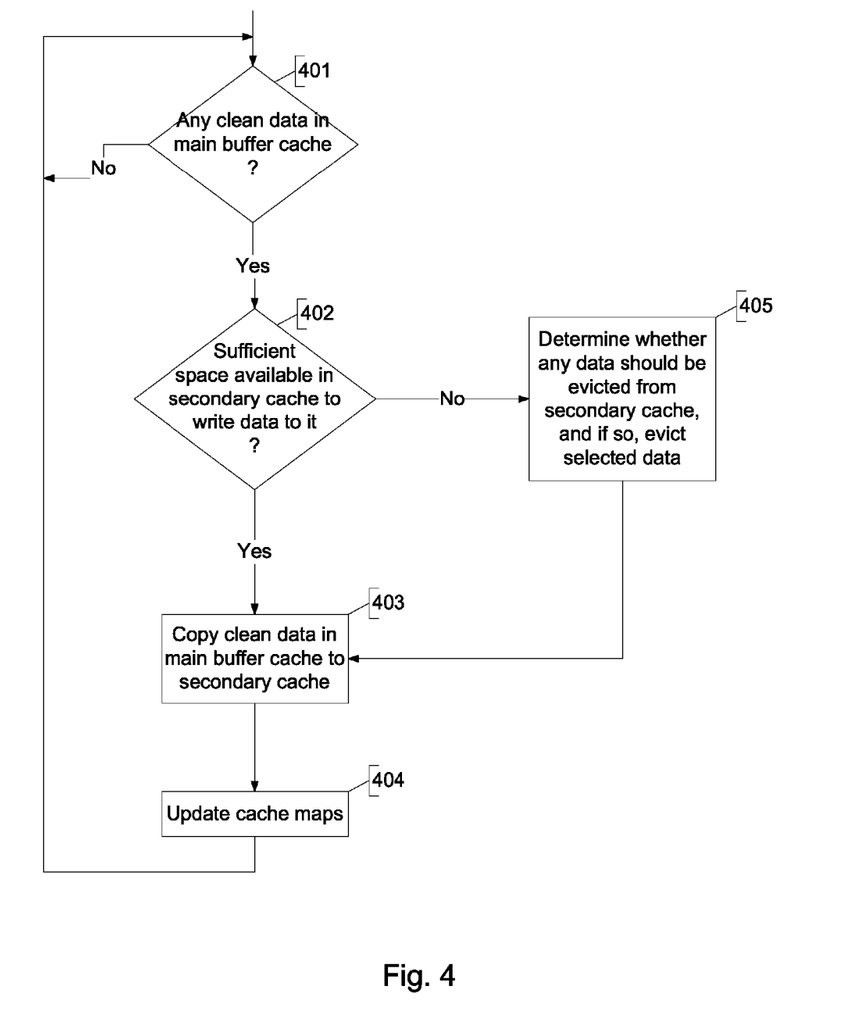
FIG. 4 is a flow diagram showing a process in a storage server for copying data to a secondary cache.

FIG. 4 illustrates an example of a process for copying data from the main buffer cache 6 to the secondary cache 7. This process can be performed in the background, i.e., concurrently with the processing of read and write requests by storage manager 21. As noted, the writing of data to the secondary cache 7 can be done in such a way as to maintain a relatively constant stream of writes to the secondary cache 7, thereby avoiding or reducing bursts of writes.

Initially, at 401 the storage manager 21 determines whether there is any clean data still stored in the main buffer cache 6. If there is no such clean data, then the process waits until clean data in the main buffer cache 6 is detected (401). When clean data is detected, the storage manager 21 determines at 402 whether sufficient space is available in the secondary cache 7 to write data to it. If sufficient space is available, then at 403 the storage manager 21 copies clean data in the main buffer cache 6 to the secondary cache 7. The storage manager 21 then updates the appropriate cache map(s) at 404, and the process then loops back to 401. If sufficient space is determined not to be available in the secondary cache 7 at 402, then the process branches to 405, where the storage manager 21 determines whether any data should be evicted from the secondary cache 7, and if so, evicts the selected data from the secondary cache 7. Any of various well-known heuristics can be employed to determine whether to evict data from the secondary cache 7, and if so, which data to evict (e.g., LRU, LFU). From 405, the process continues to 403 as described above.

Another way that space may become available in the secondary cache 7 is if the contents of a block in the secondary cache 7 are overwritten in the main buffer cache 6, rendering the current contents of the secondary cache 7 out-of-date. Yet another way that space may become available in the secondary cache 7 is if an object in the secondary cache 7 is deleted (and no copies of that object still exist).

Figure 5:
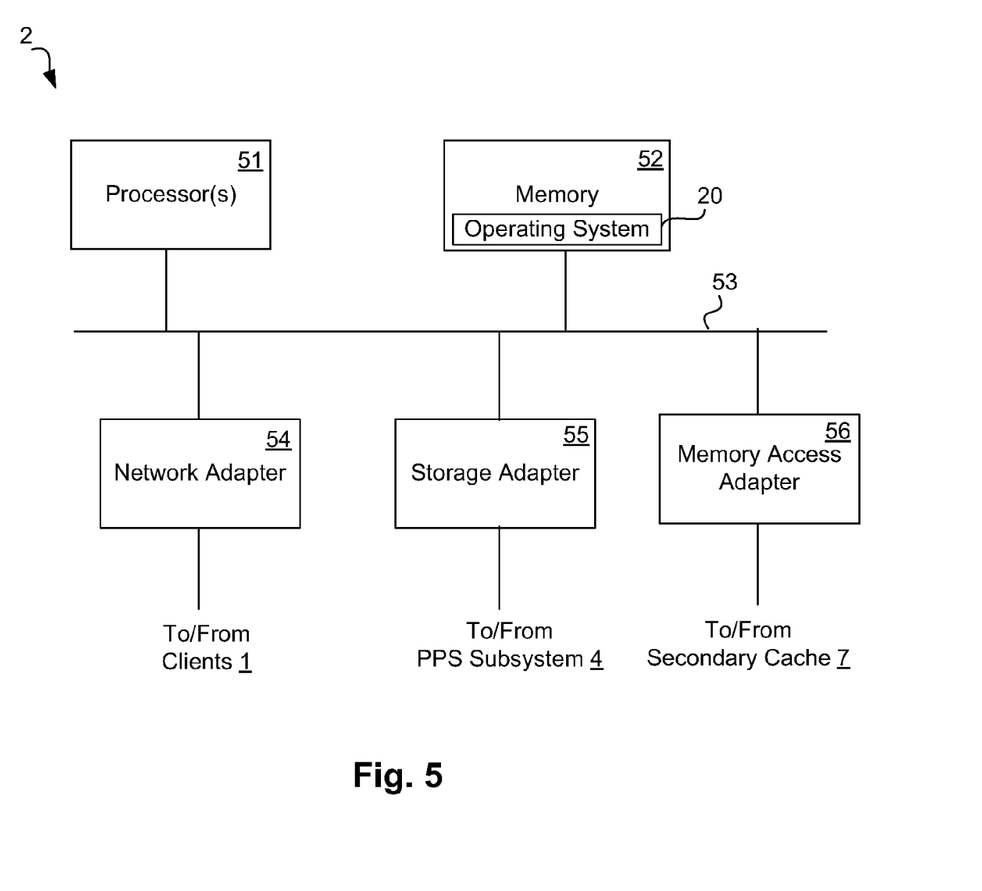
FIG. 5 is a high-level block diagram showing an example of the architecture of the storage server.

FIG. 5 is a high-level block diagram showing an example of the architecture of a storage server 2. The storage server 2 includes one or more processors 51 and memory 52 coupled to an interconnect 53. The interconnect 53 shown in FIG. 5 is an abstraction that represents any one or more separate physical buses, point-to-point connections, or both connected by appropriate bridges, adapters, or controllers. The interconnect 53, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 51 may include central processing units (CPUs) of the storage server 2 and, thus, control the overall operation of the storage server 2. In certain embodiments, the processor(s) 51 accomplish this by executing software or firmware stored in memory 52. The processor(s) 51 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 52 is or includes the main memory of the storage server 2. The memory 52 represents any form of random access memory (RAM), read-only memory (ROM), flash memory (as discussed above), or the like, or a combination of such devices. In use, the memory 52 may contain, among other things, at least a portion of the storage operating system 20 of the storage server 2.

Also connected to the processor(s) 51 through the interconnect 53 are a network adapter 54 and a storage adapter 55. The network adapter 54 provides the storage server 2 with the ability to communicate with remote devices, such as clients 1, over the interconnect 3 and may be, for example, an Ethernet adapter or Fibre Channel adapter. The storage adapter 55 allows the storage server 2 to access the PPS subsystem 4 and may be, for example, a Fibre Channel adapter or a SCSI adapter.

The storage server 2 also includes a memory access adapter 56 coupled to the interconnect 53, to enable the processor(s) 51 to access the secondary cache 7. In some embodiments, the secondary cache 7 is external to the storage server 2 (such as shown in FIG. 2). In other embodiments, the secondary cache 7 is physically attached to the main motherboard (not shown) of the storage server 2. In still other embodiments, the secondary cache 7 is implemented on a separate substrate within the storage server 2 or on a substrate that attaches to a connector on the storage server 2.

Thus, a method and apparatus for using low-cost solid-state memory to improve network storage server performance have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   writing data to a main buffer cache of a storage server in response to a write request;
   allocating a set of solid-state memory for use by the storage server as a secondary cache; and
   copying data from the main buffer cache to the secondary cache before there is a need to evict data from the main buffer cache, to reduce latency in accessing the secondary cache, the copying including copying the data at a write rate, which is determined as a function of a first write rate of the secondary cache and a data eviction rate of the main buffer cache.

2. The method as recited in claim 1, wherein the secondary cache comprises flash memory.

3. The method as recited in claim 1, further comprising:
   copying data stored in the main buffer cache to a persistent storage subsystem of the storage server; and
   marking data as clean in response to the data being copied from the main buffer cache to the persistent storage subsystem, wherein copying the data to the secondary cache is performed in response to the data being marked as clean.

4. The method as recited in claim 3, further comprising evicting data marked as clean from the main buffer cache.

5. The method as recited in claim 1, wherein said copying data from the main buffer cache to the secondary cache comprises maintaining the write rate substantially constant when writing data to the secondary cache, as long as the main buffer cache contains data to be written to the secondary cache.

6. The method as recited in claim 5, wherein said substantially constant write rate is the maximum write rate of the secondary cache.

7. A method of operating a storage server, the method comprising:
   receiving read requests and write requests at the storage server from a client over a network;
   responding to the read requests and write requests, wherein responding to the write requests includes writing data blocks to a volatile main buffer cache of the storage server in response to the write requests;
   at a consistency point, writing the data blocks in the main buffer cache to a persistent storage subsystem of the storage server and thereafter marking the data blocks written to the persistent storage subsystem as clean;
   concurrently with responding to read requests and write requests from the client, copying data blocks marked as clean to a secondary cache implemented in solid-state memory, before there is a need to evict data from the main buffer cache, the copying including copying the data at a write rate, which is determined as a function of a first write rate of the secondary cache and a data eviction rate of the main buffer cache; and
   evicting from the main buffer cache data blocks that have been copied to the secondary cache, wherein said evicting is not a response to the copying of data blocks to the secondary cache.

8. The method as recited in claim 7, wherein said writing data blocks to the main buffer cache and said writing data blocks to the persistent storage subsystem are performed by a log-structured storage manager.

9. The method as recited in claim 7, wherein the secondary cache is implemented as flash memory.

10. The method as recited in claim 7, wherein said copying data blocks to the secondary cache is performed responsive to the data blocks being marked as clean.

11. The method as recited in claim 7, wherein said copying comprises maintaining the write rate substantially constant when writing data to the secondary cache.

12. The method as recited in claim 11, wherein said copying comprises sending a stream of writes to the secondary cache at the maximum write rate of the secondary cache.

13. A storage server system comprising:
   a main buffer cache; and
   a processor configured to service read and write requests received over a network from a set of clients, including writing data to the main buffer cache and thereafter copying data from the main buffer cache to a persistent storage subsystem prior to evicting the data from the main buffer cache, and further to mark the data as clean after the data has been copied to the persistent storage subsystem, wherein the processor further is configured to copy data stored in the main buffer cache to a secondary cache implemented in solid-state memory, including to copy data marked as clean to the secondary cache prior to a need to evict data from the main buffer cache, wherein the processor is further configured to copy the data from the main buffer cache to the secondary cache at a write rate, which is determined as a function of a first write rate of the secondary cache and a data eviction rate of the main buffer cache.

14. The storage server as recited in claim 13, wherein the secondary cache comprises flash memory.

15. The storage server as recited in claim 13, wherein the processor further is configured to evict data from the main buffer cache only after the data has been marked as clean.

16. The storage server as recited in claim 13, wherein the processor is configured to reduce the likelihood of bursts of writes to the secondary cache by maintaining the write rate substantially constant when writing data to the secondary cache, as long as the main buffer cache contains data to be written to the secondary cache.

17. The storage server as recited in claim 13, wherein the processor is configured to write the data marked as clean to the secondary cache at the maximum write rate of the secondary cache.

18. A network storage system comprising:
   a network interface through which to communicate with a set of clients over a network;
   a storage interface through which to communicate with a persistent storage subsystem of the storage system;
   a main buffer cache, to cache data read from and data to be written to, the persistent storage subsystem;
   a secondary cache implemented in non-volatile solid-state memory, to cache data initially stored in the main buffer cache; and
   a storage manager to service read and write requests from the clients, including writing data to the main buffer cache and thereafter copying data from the main buffer cache to the persistent storage subsystem at a consistency point, wherein the storage manager further is to mark the data as clean when the data has been copied to the persistent storage subsystem, wherein the storage manager further is to reduce the likelihood of bursts of writes to the secondary cache by copying data marked as clean in the main buffer cache to the secondary cache before there is a need to evict the data from the main buffer cache, wherein the storage manager is further configured to copy the data from the main buffer cache to the secondary cache at a write rate, which is determined as a function of a first write rate of the secondary cache and a data eviction rate of the main buffer cache.

19. The network storage system as recited in claim 18, wherein the secondary cache comprises flash memory.

20. The network storage system as recited in claim 18, wherein the storage manager further is to evict from the main buffer cache data marked as clean.

21. The network storage system as recited in claim 20, wherein eviction of said data from the main buffer cache is not in response to the data being marked as clean.

22. The network storage system as recited in claim 18, wherein the storage manager maintains the write rate substantially constant when writing data to the secondary cache, as long as the main buffer cache contains data to be written to the secondary cache.

23. The network storage system as recited in claim 22, wherein the storage manager writes data to the secondary cache at approximately the maximum write rate of the non-volatile solid-state memory.

\* \* \* \* \*